No. 863,259. PATENTED AUG. 13, 1907.
J. C. BUCKBEE.
MOTOR TIPPED SLAG CAR.
APPLICATION FILED JULY 31, 1905. RENEWED JUNE 14, 1907.

3 SHEETS—SHEET 3.

UNITED STATES PATENT OFFICE.

JOHN C. BUCKBEE, OF CHICAGO, ILLINOIS, ASSIGNOR TO ALLIS-CHALMERS COMPANY, OF MILWAUKEE, WISCONSIN, A CORPORATION OF NEW JERSEY.

MOTOR-TIPPED SLAG-CAR

No. 863,259.     Specification of Letters Patent.     Patented Aug. 13, 1907.

Application filed July 31, 1905, Serial No. 271,873. Renewed June 14, 1907. Serial No. 378,926.

*To all whom it may concern:*

Be it known that JOHN C. BUCKBEE, a citizen of the United States, residing at Chicago, in the county of Cook and State of Illinois, has invented certain new and useful Improvements in Motor-Tipped Slag-Cars, of which the following is a specification.

The invention relates to tilting cars designed to dump their contents at either side of the car.

The object is to provide a means for performing the tilting of the car and also an improved car frame for the tilting car body.

Figure 1:
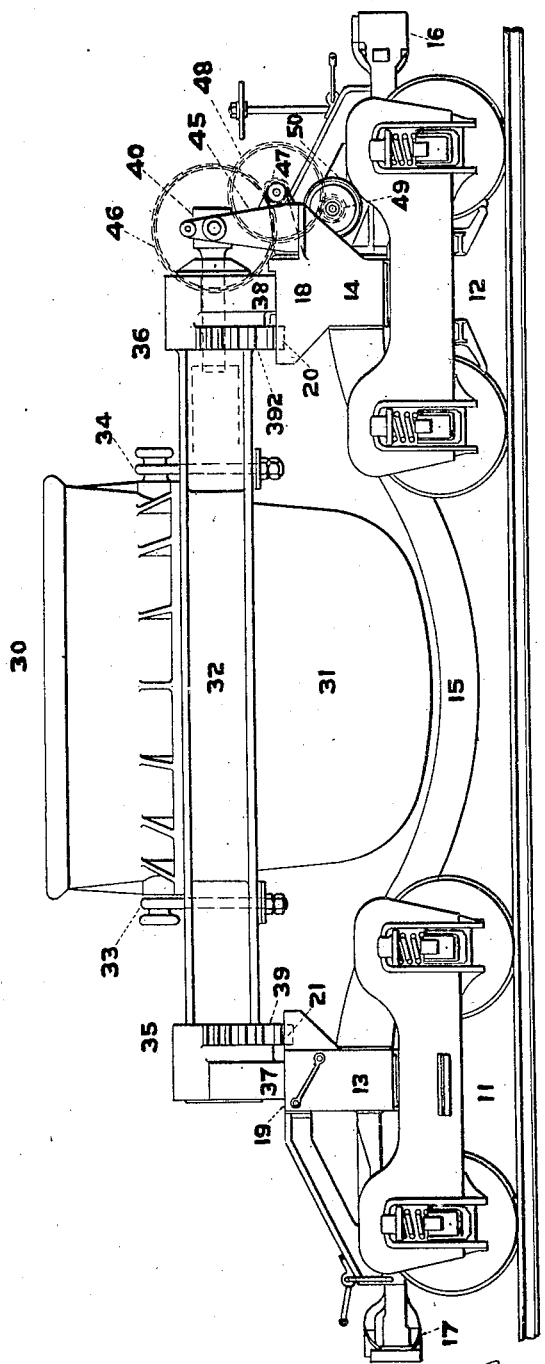
Figure 2:
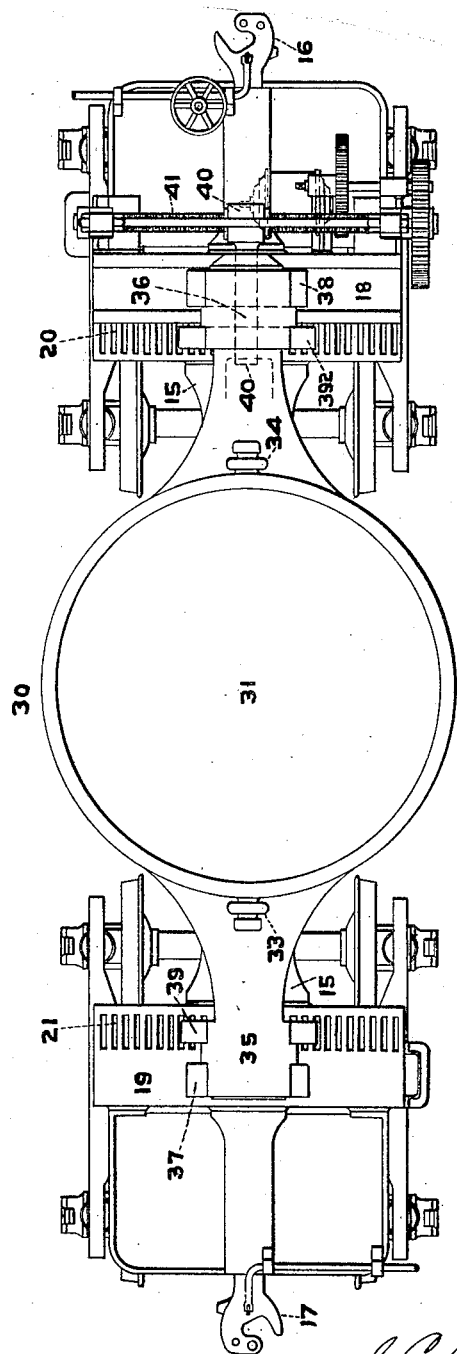

In the drawings,—Figure 1 is a side view of the car. Fig. 2 is a plan view; and Fig. 3 an enlarged end view of the car.

The car has two trucks 11, 12. Upon the trucks is mounted the frame including transverse bolsters 13, 14, center-pinned to the trucks as usual. The bolsters are integrally connected by a longitudinal curved sill 15. The draft gear 16, 17, is supported by and attached to the transverse bolsters 14, 13. The bolsters include transverse bases or ways 18, 19, and transverse racks 20, 21.

Upon the car frame bolsters is mounted the car body 30. This includes the ladle 31 mounted securely in a ring 32 by means of tie bolts 33, 34. The ring 32 is formed at the ends of the car into trunnions 35, 36. These trunnions have smooth roller portions 37, 38 coacting with the bolster ways 19, 18, and gearing 39, 392 engaging with the bolster rack portions 21, 20. The roller portions 37, 38, are usually formed with a curved surface equidistant from the trunnion axis but may be of other curved form such as, for instance, would tend to roll the car body 30 to its erect position from either dumping position. The gearing 39, 392 is of the same pitch surface as the roller portions 37, 38, and need not be complete gears, the mutilated gears shown being sufficient.

Longitudinally and preferably axially in one of the trunnions 36 is rotatably mounted a pin 40. Transversely screwed through the outer end of the pin 40 is an operating screw 41 mounted at its ends in bearings 42, 43, carried in frame work 44, 45, bolted to the bolster 14. This screw 41 constitutes a positive mechanical actuating means for the pin 40, constraining it to have a motion of translation parallel to the base 18. On one end of the screw 41 is keyed a gear wheel 46 which meshes through reducing gearing 47, 48, with pinion 49, on the shaft of electric motor 50. The reducing gearing and the motor are carried by suitable frame work, not specially shown, bolted to the car frame.

Figure 3:
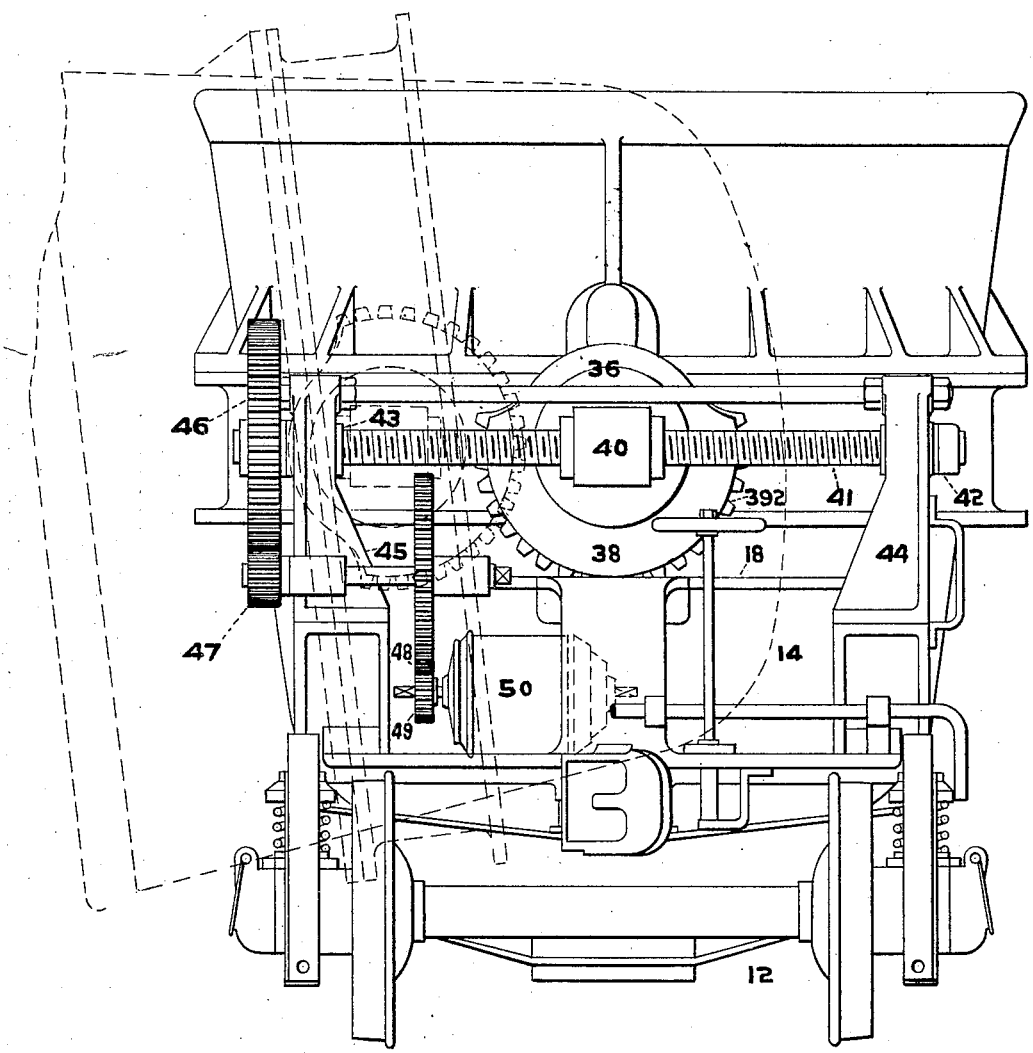

In operation, as the motor is set in motion in either direction, the pin 40 is laterally translated parallel to the ways 18, 19, causing the trunnions to move in the same direction they rolling on the roller portions 37, 38, being constrained to coextensive movement by the gearing 39, 392, and racks 21, 20. The car body 30 is thus moved sidewise and tilted at the same time, discharging its contents at either side of the car. The dotted line position of Fig. 3 shows the relation of the parts in dumping.

In accordance with the provisions of the patent statutes I have described the principle of operation of my invention, together with the apparatus which I now consider to represent the best embodiment thereof; but I desire it to be understood that the apparatus shown is merely illustrative and that the invention can be carried out by other means.

What I claim is,—

1. In a tilting car, a car frame, a trunnioned body on the frame, means relatively rotatably coacting with a trunnion, rolling means on the trunnions, a base on the car frame coacting with the rolling means, and positive, mechanical, actuating means on the car frame for translating the first means parallel to the base.

2. In a tilting car, a car frame, a trunnioned body on the frame, means relatively rotatably coacting with a trunnion, rolling means on the trunnions, a base on the car frame coacting with the rolling means, and positive, mechanical, actuating means coacting directly with the first means for translating the first means parallel to the base.

3. A car, a trunnioned body thereon, a base on the car, rack and gear engagement between the base and trunnions, means loosely engaging a trunnion, and an actuating screw coacting directly with the loose means.

4. In a tilting car, a frame, a trunnioned body on the frame, a pin axially mounted in a trunnion rotatable thereon, a screw transversely threaded through the pin and mounted on the frame, and means for operating the screw.

5. In a tilting car, a frame, a trunnioned body on the frame, a pin axially mounted in a trunnion rotatable thereon, roller portions and gearing on the trunnions coacting with the frame, a screw transversely threaded through the pin and mounted on the frame, and means on the frame for operating the screw.

6. In a tilting car, a frame including transverse bolsters, racks on the bolsters, a trunnioned body on the frame, a pin axially mounted in a trunnion rotatable thereon, roller portions on the trunnions coacting with the bolsters, segmental gearing on the trunnions coacting with the racks, a screw transversely threaded through the pin and mounted on the frame, and means on the frame for operating the screw.

7. In a tilting car, a frame including transverse bolsters, a smooth way and a rack on each bolster, a trunnioned body on the frame, a pin axially mounted in a trunnion rotatable thereon, roller portions on the trunnions coacting with the ways, segmental gearing on the trunnions coacting with the racks, a screw transversely threaded through the pin and mounted on the frame, and means on the frame for operating the screw.

8. In a tilting car, a frame including transverse bolsters, a smooth way and a rack on each bolster, a trunnioned body on the frame, a pin axially mounted in a trunnion rotatable thereon, roller portions on the trunnions coacting with the ways, segmental gearing on the trunnions coacting with the racks, and means for transversely translating the pin.

9. In a tilting car, a frame including transverse bolsters, a trunnioned body on the frame, a pin longitudinally mounted in a trunnion rotatable thereon, and means for transversely translating the pin.

In testimony whereof I affix my signature in presence of two witnesses.

JOHN C. BUCKBEE.

Witnesses:
G. F. DE WEIN,
JOHN DAY, Jr.